US011631103B2

(12) United States Patent
Lal et al.

(10) Patent No.: US 11,631,103 B2
(45) Date of Patent: Apr. 18, 2023

(54) SYSTEM AND METHOD FOR TRACKING EARNED REWARDS FOR ONLINE TRANSACTION

(71) Applicant: Capital Intellect, Inc., Boston, MA (US)

(72) Inventors: Ranjan Lal, Wellesley, MA (US); Brian D. Boodman, Somerville, MA (US); Eric Patacchiola, Quincy, MA (US)

(73) Assignee: Capital Intellect, Inc., Boston, MA (US)

( * ) Notice: Subject to any disclaimer, the term of this patent is extended or adjusted under 35 U.S.C. 154(b) by 105 days.

(21) Appl. No.: 16/890,571

(22) Filed: Jun. 2, 2020

(65) Prior Publication Data

US 2020/0394677 A1 Dec. 17, 2020

Related U.S. Application Data

(60) Provisional application No. 62/861,104, filed on Jun. 13, 2019.

(51) Int. Cl.
*G06Q 30/02* (2012.01)
*G06Q 30/0207* (2023.01)
(Continued)

(52) U.S. Cl.
CPC ..... *G06Q 30/0239* (2013.01); *G06Q 30/0211* (2013.01); *G06Q 30/0222* (2013.01); *G06Q 30/0277* (2013.01)

(58) Field of Classification Search
CPC combination set(s) only.
See application file for complete search history.

(56) References Cited

U.S. PATENT DOCUMENTS 8,498,898 B1 * 7/2013 Kogen ............... G06Q 30/02
705/14.1
9,613,358 B1 4/2017 Gardner
(Continued)

FOREIGN PATENT DOCUMENTS

CA 2814448 A1 * 11/2013 ........... G06F 3/0482
KR 20170115925 A * 2/2017 ........... B60T 17/225

OTHER PUBLICATIONS

International Search Report for PCT/US2020/035734, dated Aug. 18, 2020.

*Primary Examiner* — Marie P Brady
(74) *Attorney, Agent, or Firm* — Morse, Barnes-Brown & Pendleton, P.C.; Sean D. Detweiler, Esq.

(57) ABSTRACT

A system and method for providing, on a user device, a way to confirm and track rewards earned based on online transaction on a user device without unnecessary reliance on publisher. The disclosed systems and methods move the authorization and confirmation of earned rewards from the purview of the publisher and/or advertiser to the user. The systems and methods empower the user by providing control and information on the process of reward payment that is traditionally handled or controlled by the other parties involved in the reward payment process. The systems and methods provide immediate confirmation that a reward has been earned and creates a record validating that the user is entitled to the reward. The confirmation and record provided by the systems and methods increases the user's ability to advocate for their position while the publisher is provided with further assurance that a reward payment is justified.

15 Claims, 8 Drawing Sheets

(51) Int. Cl.
*G06Q 30/0241* (2023.01)
*G06Q 30/0211* (2023.01)

(56) References Cited

U.S. PATENT DOCUMENTS

| | | | |
|---|---|---|---|
| 10,007,915 B2* | 6/2018 | Singh | G06Q 30/02 |
| 10,096,043 B2* | 10/2018 | Beck | G06Q 30/0267 |
| 10,748,170 B2* | 8/2020 | El-Hage | G06Q 30/0228 |
| 2011/0300902 A1* | 12/2011 | Kwon | G06Q 30/02 |
| | | | 455/556.1 |
| 2012/0095820 A1* | 4/2012 | Chandrasekaram | G06Q 30/02 |
| | | | 705/14.23 |
| 2012/0109734 A1* | 5/2012 | Fordyce, III | G06Q 30/0239 |
| | | | 705/14.25 |
| 2012/0191525 A1* | 7/2012 | Singh | G06Q 20/405 |
| | | | 705/14.27 |
| 2014/0074569 A1* | 3/2014 | Francis | G06Q 20/24 |
| | | | 705/14.3 |
| 2014/0074658 A1* | 3/2014 | Sanchez | G06Q 30/0222 |
| | | | 705/26.62 |
| 2014/0244353 A1 | 8/2014 | Winters | |
| 2015/0134437 A1* | 5/2015 | Watanabe | G06Q 30/0225 |
| | | | 705/14.26 |
| 2015/0309910 A1* | 10/2015 | Cook | H04L 67/535 |
| | | | 709/224 |
| 2015/0310478 A1* | 10/2015 | Bakker | G06Q 30/0222 |
| | | | 705/14.23 |
| 2015/0356690 A1 | 12/2015 | Celikyilmaz et al. | |
| 2017/0124548 A1* | 5/2017 | Bolla | H04W 4/023 |
| 2017/0286987 A1* | 10/2017 | Carter | G06Q 30/0229 |
| 2018/0137500 A1* | 5/2018 | Greene | G06Q 20/387 |
| 2019/0068739 A1* | 2/2019 | Shaffer | G06F 21/53 |
| 2019/0139019 A1* | 5/2019 | Bloys | G06Q 20/3223 |
| 2019/0228428 A1* | 7/2019 | Bruner | G06Q 30/0222 |
| 2019/0340602 A1* | 11/2019 | Li | G06Q 20/4014 |
| 2020/0151774 A1* | 5/2020 | Lal | G06Q 30/0277 |
| 2020/0394677 A1* | 12/2020 | Lal | G06Q 30/0239 |
| 2021/0103921 A1* | 4/2021 | Gadwale | H04L 63/12 |

* cited by examiner

FIG. 1

PRIOR ART

SYSTEM AND METHOD FOR TRACKING EARNED REWARDS FOR ONLINE TRANSACTION

CROSS-REFERENCE TO RELATED APPLICATION(S)

This application claims priority to, and the benefit of, U.S. Provisional Application 62/861,104, filed Jun. 13, 2019, for all subject matter common to both applications. The disclosure of said provisional application is hereby incorporated by reference in its entirety.

FIELD OF THE INVENTION

The present invention relates to technology for tracking earned rewards for online transactions. The technology removes dependency on advertiser and publishers for tracking and determining rewards a user is entitled to, based on online transactions with advertisers. More specifically, the system and method of the technology enable a convenient way for a user to keep track of the rewards earned for transactions with advertisers participating in publisher reward initiatives.

BACKGROUND

Publishers, such as coupon or cashback rewards websites, have gained popularity for encouraging sales at participating advertisers (also called retailers) by offering rewards for transactions with those participating advertisers. Traditionally, users who earn rewards from publishers for online transactions with a participating advertiser/retailer are reliant on both the advertiser and the publisher for the confirmation, tracking, and collection of the rewards.

More specifically, record keeping and tracking of earned refunds are conventionally the responsibility of the publisher. The publisher is in turn reliant on the advertiser for the reporting and confirmation of reward eligible transactions. As such, publishers typically do not pay rewards to users until they have received confirmation of the transaction and been paid by the advertiser. It may take advertisers some time to confirm a rewards earning transaction. It may then take additional time for the publisher to process the transaction confirmation data from the advertiser and provide the reward payout to the user.

Furthermore, there is very little transparency for the user regarding their status in this process. This can be problematic for the user because if and when the user receives the reward is dependent on third parties and largely outside the control or even knowledge of the user. The delay in payout and lack of knowledge regarding the process can make it difficult for a user to confirm that a reward was correctly paid out. Furthermore, if the user did not properly document that they qualified for the reward, they may have little recourse to settle disputes regarding any payouts for rewards the user may have earned from historical purchasing activity.

Similarly, the publisher is reliant on the advertiser for the reporting of sales that earned rewards and is typically not aware of a transaction until the advertiser reports it. As such, publishers can be put in an awkward position of being asked for a reward payout from a user for a transaction they are not aware of because they have not received the corresponding information from the advertiser.

SUMMARY

There is a need for a technology for providing a user with the ability to confirm, document, and track the earning of rewards for online transactions without unnecessary reliance on the publisher and advertiser. The present invention is directed toward further solutions to address this need, in addition to having other desirable characteristics. Specifically, instead of relying on third parties, such as the publisher and/or advertiser for the confirmation of an earned reward, the present invention provides reward confirmation and tracking on the user device. This information can then be provided to the publisher for comparison and verification of publisher data on earned rewards including reporting from advertisers on transactions.

In accordance with example embodiments of the present invention, a method of tracking earned rewards for online transactions, necessitated by the e-commerce market, is provided. The method includes determining when a reward is authorized; determining when a transaction is conducted; generating a record of reward earned; and displaying confirmation of earned reward. The step of determining of when reward is authorized involves determining, on a user device comprising a processor, when a reward is authorized by a publisher for an online transaction with an advertiser using an electronic network, a publisher processor and a data store of a publisher system by processing data previously received prior to the online transaction from one or more computer devices of the advertiser corresponding to an initiative of the publisher. The step of determining when a transaction is conducted involves determining, on a user device, when the online transaction with the advertiser involving a reward is conducted by parsing and extracting activity identifier data from transaction data corresponding to the online transaction made with the advertiser. The step of generating a record involves generating, on a user device, a record of reward earned based on a conducted transaction with advertiser. The step of displaying a confirmation involves displaying, on a graphical user interface of a user device, confirmation of earned reward based on conducted transaction with advertiser.

In accordance with aspects of the present invention, the method is performed by an extension for a web browser.

In accordance with aspects of the present invention, the step of determining a reward is authorized by a publisher involves accessing from the publisher system, a listing of authorized rewards and participating advertisers; determining when the advertiser participating in the online transaction has been stored in the data store of the publishing system in a received listing of participating advertisers; and determining when the online transaction is eligible for reward by parsing and extracting activity identifier data from transaction data corresponding to the online transaction and comparing the activity identifier data to stored data corresponding to the advertiser to determine a match for any parameters of an initiative of the publisher.

In accordance with aspects of the present invention, the step of determining a reward is authorized by publisher involves sending an inquiry to the publisher system regarding the online transaction with advertiser; and receiving a response from the publisher system whether the online transaction with advertiser is authorized for reward.

In accordance with aspects of the present invention, the step of determining when the online transaction with the advertiser involving reward is conducted includes determining when the online transaction has obtained transaction confirmation data from a transaction confirmation page of the advertiser and details of confirmed transaction meet requirements for authorized reward.

In accordance with aspects of the present invention, the activity identifier data comprises one or more of tracking parameters, transaction type data, user account data, link data, purchase amounts, receipt data, registered user profile data, advertiser identification data, device data or stored uniquely identifying data.

In accordance with aspects of the present invention, the method further involves sending the generated record of earned reward to the publisher system; and storing, at the publisher system, the received record of earned reward.

In accordance with additional aspects the method can additionally include receiving, at the publisher, a record of the online transaction involving reward from the advertiser and the record of rewards earned from publisher; paying, using a processor of the publisher, a reward payment made by at least one transfer to a user account according to stored processing data corresponding to a stored user profile; and generating and storing updates to the user account, the stored processing data, and the stored user profile corresponding to the reward payment.

In accordance with still further aspects, the paying of the reward payment occurs and prior to at least one of the group consisting of locking a commission of the advertiser, expiration of a refund period, payment of a commission by the advertiser to the publisher system, payment of a commission by the advertiser to an affiliate network, and combinations thereof.

In accordance with still further aspects, the method further involves receiving, at the publisher, a record of the online transaction involving reward from the advertiser; comparing record received from user device and record received from advertiser; and generating inquiry if discrepancies between received records found.

In accordance with still further aspects, the method further includes sending, from the publisher system to the user device, a record of rewards earned from publisher.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a technological advancement in the form of a system and method for providing, on a user device, the practical outcome of a heretofore previously unavailable way to confirm and track rewards earned based on online transaction on a user device without unnecessary reliance on a publisher or advertiser. The disclosed systems and methods move the authorization and confirmation of earned rewards from the purview of the publisher and/or advertiser and to the user. The systems and methods empower the user by providing control and information on a technologically implemented process, namely earned rewards for an online transaction, that is traditionally handled or controlled by the other parties involved in the transaction, namely the publisher and advertiser. By giving the user greater control and information about the process of earning rewards, the user's engagement and in turn satisfaction with the process increases. The systems and methods provide immediate, real-time, confirmation that a reward has been earned and creates a record validating that the user is entitled to the reward. The confirmation and record provided by the systems and methods increases the user's (as well as the publisher's) ability to advocate for their position should a question or issue about their earned reward arise. The generated confirmation and record also provides the publisher with further confirmation that the reward is justified. This extra verification can also serve to minimize the risk for the publisher in paying out the reward before receiving payment from the advertiser allowing the user to be paid sooner. Thus numerous practical applications and benefits result from the technology and process of the present invention.

In a conventional reward payment cycle, a publisher acts to assist in advertising the product of an advertiser to a group of consumers or users, who in turn are exposed to content from the publisher, which under ideal conditions leads to interaction with the advertiser resulting in a purchase by the user of products sold by the advertiser. The user may be further incentivized to engage in a purchase transaction by being offered a discount or reward for completing a particular type of purchase at a particular advertiser. Other entities may also offer discounts or rewards to consumers or users. When a sale results from activity undertaken by the publisher on behalf of the advertiser, the advertiser compensates the publisher with a commission. The commission may be subject to various rules set by the parties including payment of specific commission amounts for specific types of sales that may be subject to reversal or modification according to agreed upon rules and terms, as well as rules that may indicate how activities of the user are counted for commission purposes. The commission payment may be based on a number or percentage of traceable sales, other conversion events such as cost per conversion metrics, or other metrics including cost per click, cost per impression, or payment defined by time periods under which advertising is performed on behalf of the advertiser. The transactions involved may be directly between parties, or facilitated by intermediaries, and may be completed in person or using electronic means, such as the internet, as a conduit for the transaction.

A publisher is defined according to industry standards as an entity or company that displays advertisements, most often in return for compensation in the form of a commission. A publisher may operate a website to interact with consumers, users, advertisers, retailers, and other entities, and may also be referred to as a coupon website. Additionally, a publisher may offer enrollment in services and programs to consumers or users who then become members and receive offers or services in exchange for participation that may include exchange of data or information related to the member or their behavior. A publisher who offers rewards to such users may also be referred to as a reward website or a cashback website.

An advertiser is defined according to industry standards as an entity or company that pays publishers to display advertisements and engages in commercial transactions with customers, consumers, or other users. An advertiser may also be referred to as advertiser retailer and may participate in an initiative or program to pay commissions related to an advertising campaign or other strategic initiative or marketing strategy. These commissions may be paid to publishers according to rules and terms set by those parties.

A user is defined as any individual person or entity that participates in a financial transaction (in most cases a purchase transaction) or other economic activity with an advertiser, and may, prior to or after such a financial transaction, engage in transactions or otherwise participate in programs or receive services related to a publisher, including receiving reward payments for financial transactions with an advertiser that were facilitated by the user's interaction with advertising information supplied or presented by that publisher.

A financial entity may be a bank, credit union, financial institution, credit card company or other financial services provider, or any entity that provides, owns, manages, or services accounts belonging to or assigned to a customer, user, member, advertiser, retailer, publisher, affiliate network, or other payment cycle entity, which store currency or assets for financial transactions, including cryptographic currency, or otherwise facilitate transactions using known banking channels, or the like. Financial entities are by definition separate entities from advertisers publishers.

An affiliate network is a network or group of entities participating together and acting as an intermediary transferring data between publishers and advertisers. Affiliate networks may enable easier transfer or exchange of leads, customers, promotions, programs or other resources between participating member entities. Affiliate networks may aggregate data and allow members access to greater sets of resources than would otherwise be available, often in exchange for fees or sharing of revenue from related activities agreed upon by member entities.

A commission is an agreed upon amount or value to be paid for services including rendered to a party, including advertising services rendered by a publisher to an advertiser. An unlocked commission is a commission that is not finalized and may be modified or reversed by the retailer or advertiser. A locked commission is a commission that a retailer or advertiser has locked. Locked commissions cannot be modified. An advertiser may report locking information to a publisher. Advertisers may also set locking directly, report, "all sales older than X days are locked", or report, "this sale can be treated as locked on day X." A reversal is a commission that an advertiser initially intended to pay, but chose not to pay, or modified, choosing to not fully pay (e.g., because the commissioned transaction was refunded).

FIGS. 1 and 3 through 8, wherein like parts are designated by like reference numerals throughout, illustrate an example embodiment or embodiments of a system and method for providing, on a user device, a way to confirm and track rewards earned based on online transaction on a user device without unnecessary reliance on publisher, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

Figure 1:
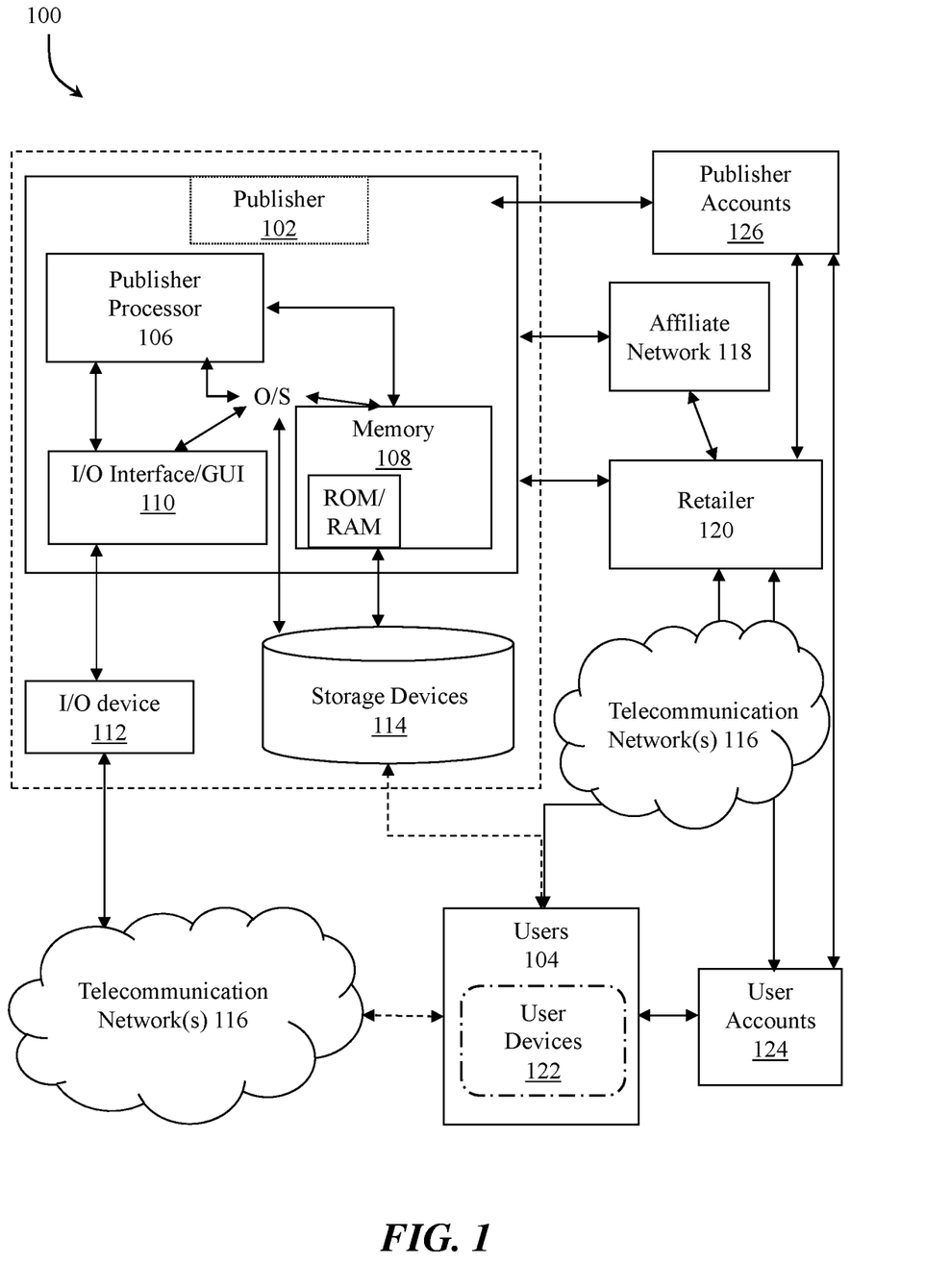
FIG. 1 is a diagrammatic overview of the publisher system for diminishing latency in processing reward payments to users using automated clearing house transactions.

FIG. 1 represents a diagrammatic overview of a system 100 in which users 104 are provided a way to confirm and track rewards earned based on a transaction without unnecessary reliance on the other parties involves in earning the reward. The system 100 may operate in support of a cashback website provided by a publisher 102. The publisher 102 may implement the rebate initiative or program using a server comprising a processor 106 and memory 108 operated in conjunction with an operating system. The system 100 also comprises one or more storage devices 114 that may be of various types including databases or block chains stored internally or externally to the publisher 102, input/output interfaces 110, and other input output devices 112 that may be used to interact with various entities and components including users 104, user devices 122, user accounts 124, retailers or advertisers 120, affiliate networks 118, internal or external publisher accounts 126 that may be held with financial entities, and other entities, wherein communication may be accomplished directly or electronically by telecommunications or other electronic communications networks 116. The system 100 enables a user 104 to click or activate with a user device 122 a publisher 102 link or other interactive conduit that may be presented on the publisher 102 website operated as part of the system 100 or elsewhere including other sites on the internet 116. The system 100 enables a user 104 to communicate with an advertiser 120 and make one or more purchases for which that user 104 is able to request payment from the publisher 102 once the advertiser 120 or user 104 provide data verifying the sale purchase. Most often the publisher 102 redirects the user 104 to an affiliate network 118 (or to advertiser 120 content or resources), adding special tracking parameters to monitor and verify activity. The affiliate network 118 then further facilitates communication with the advertiser 120. The user 104 interacts with the advertiser 120 and makes a purchase. The advertiser 120 reports that purchase to publisher 102 using the system 100. This report typically includes the tracking parameters, the expected commission, and the sale value. Optionally, the advertiser 120 may send one or more additional purchase reports to indicate changes to the commission and sale value (e.g., due to transaction reversals). The system 100 further allows the user 104, through the user device 122, to track and record rewards earned by the purchase. The system 100 then enables the user 104 to submit requests for reward payment and other activity identifier data, including by user device 122, to the publisher 102. The system 100 enables payment cycle steps where the advertiser 120 at some point then reports that sale is locked, and advertiser 120 subsequently pays publisher 102, then the publisher 102 pays the user 104 for locked sales and as a result payment is deposited in a user account 124, The publisher 102 monitors, tracks, stores using the storage devices 114, and updates using the processor 106, memory 108 and storage devices 114, all of the activities of the respective members and components of the system 100, allowing for the processor 106 to be used by the system 100 to derive additional data and intelligence from the functioning of the system 100 over time. Concurrently and in conjunction with the publisher 102, each user 104, also monitors, tracks, stores, and updates locally using each user device, the activities relating to rewards earned for the particular user.

Figure 2:
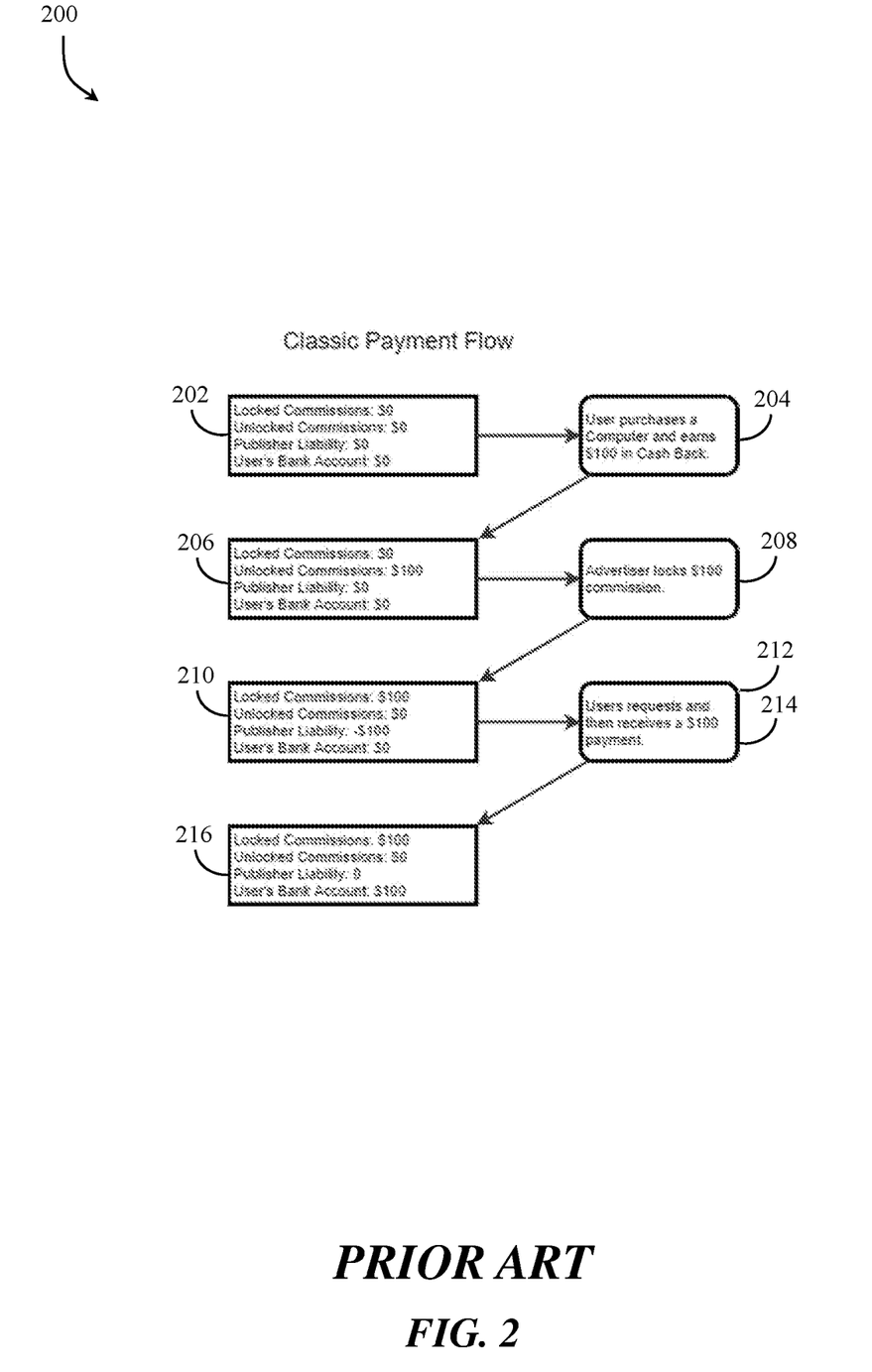
FIG. 2 is a diagrammatic flow chart illustrating an example conventional computer implemented method currently known that shows how a user experiences a standard reward payment flow.

FIG. 2 illustrates a diagrammatic flow chart of an example conventional computer implemented method 200 that shows how a user 104 experiences a standard payment flow in a reward payment cycle. In the standard reward payment cycle a user 104 makes a purchase and is able to request payment from the publisher 102 only once the advertiser 120 locks the commission. Most often the process of the payment cycle starts at Step 202 when a user 104 clicks with a user device 122 a publisher 102 link that may be presented on the publisher website operated by the system 100 or elsewhere including other sites on the internet 116. That publisher 102 redirects the user 104 to an affiliate network 118 (or to advertiser 120 content or resources), adding tracking parameters. The user 104 interacts with the advertiser 120 and makes a purchase (e.g. a computer) at Step 204, thereby earning a reward (e.g. cashback reward). The advertiser 120 reports that purchase to publisher 102 at Step 206, thereby establishing and verifying the existence of an unlocked commission to be paid to the publisher 102 in the future (e.g. system 100 records would indicate $0 in locked commissions; $100 now present in unlocked commissions; $0 in accrued publisher 102 liability; and $0 transferred to user's bank account 124). This report typically includes the tracking parameters from prior steps, the expected commission, and the sale value. Optionally, the advertiser 120 may send one or more additional purchase reports to indicate changes to the commission and sale value (e.g., due to transaction reversals). At Step 208, the advertiser 120 at some point then reports that sale is locked as a locked commission. A locked sale is a commitment by the advertiser 120 that the sale will not be modified, updated in the records stored in the system 100. The advertiser 120 subsequently pays publisher 102 by a transaction with the publisher account 126 for locked sales at Step 210 (e.g. system 100 records would indicate $100 in locked commissions; $0 in unlocked commissions; $−100 in publisher 102 liability for a known but unprocessed reward and a received $100 payment; and $0 transferred to user's bank account 124). Then, in response to a user 104 request, Step 212, the publisher 102 pays the user 104 (including from the publisher account 126) for locked sales at Step 214 and as a result payment is deposited in a user's bank account 124, and publisher 102 records and accounts 126 reflect both receipt of the advertiser 120 commission and payment to the user's bank account 124 at Step 216 (e.g. system 100 records would indicate $100 in locked commissions; $0 in unlocked commissions; $0 in publisher 102 liability due to payment to user 104; and $100 successfully transferred to user's bank account 124).

In the payment cycle, typically payment is made through conventional banking channels, including payment by check, credit card, etc. Most often, advertisers 120 set periods of time that must elapse from the time of sale to the time of locking commission. This is because the payment cycle may be disrupted. Disruptions in the reward payment cycle often include user-initiated transaction reversals. To minimize the effect of such disruptions the advertiser 120 implements a refund period (refund window) during which users 104 may initiate reversals prior to locking commission. Only upon expiration of the refund period does the advertiser 120 lock commissions. This delay improves outcomes for advertisers 120, minimizing the probability of paying a commission for a sale that was ultimately not realized, however the delay is inefficient and inconvenient for both publishers 102 and users 104, and also frequently results in difficulties processing data and tracking or attributing activities related to purchase behavior.

Traditionally, outside the transaction with the advertiser which earns the reward, the user is not involved with or otherwise aware of the other steps, processes, or interactions by the publisher and advertiser that are necessary to result in payment of the reward. Indeed, the user may not even be aware of the details of the reward, such as whether a reward was earned, the amount earned, or the status of the payment until the payment is actually provided to the user at the conclusion of the whole process. Even if the user may have an idea of the reward earned at the time of the purchase, the time and delays involved in processing and paying out the reward can cause the user to forget, lose, or otherwise be confused about the reward by the time of payout occurs.

Figure 3:
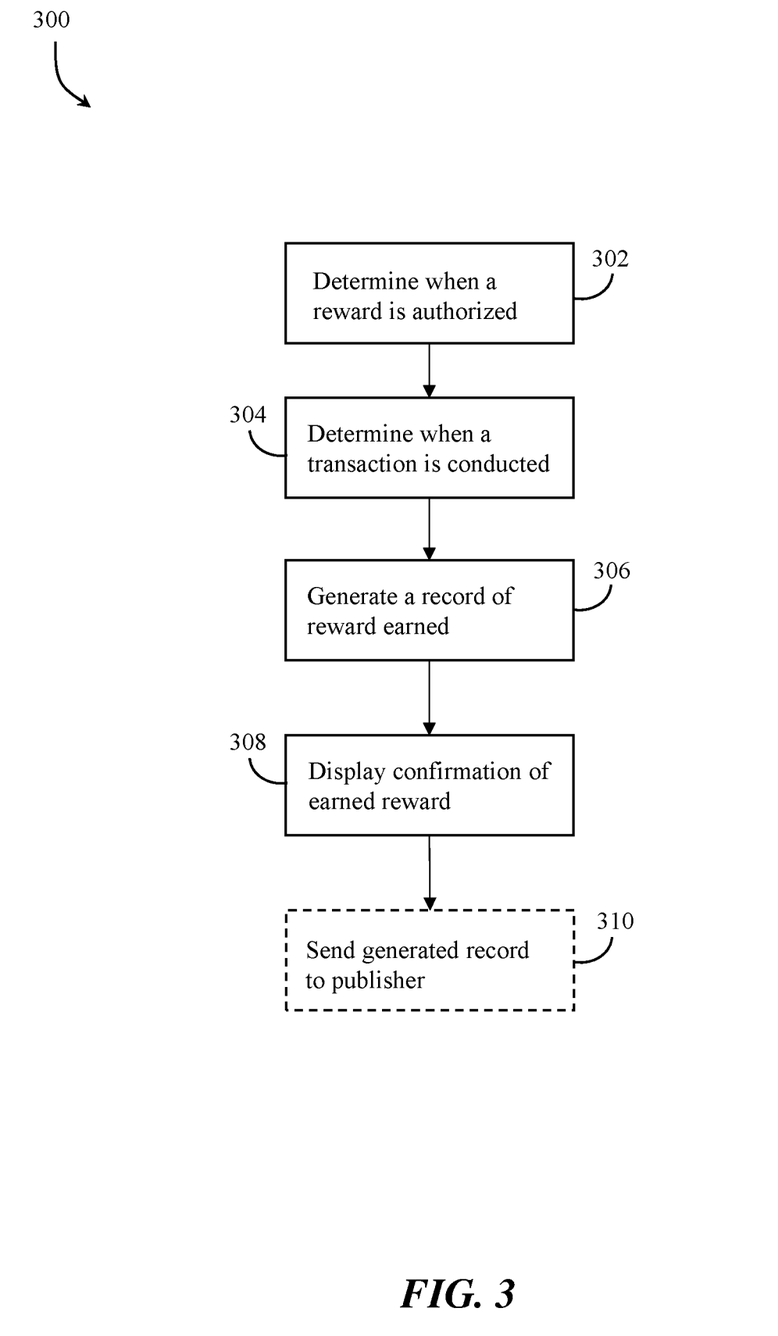
FIG. 3 is a diagrammatic flow chart illustrating an example computer implemented method showing the reward tracking implemented on a user device.

FIG. 3 demonstrates how the handling of rewards is improved using an example computer implemented method 300 for tracking rewards to users 104. The method 300 starts with determining of a reward is authorized (step 302). It is then determined when a transaction that would earn the authorized reward is conducted (step 304). A record of the reward earned based on the conducted transaction is then generated (step 306). Confirmation of the reward earned is then displayed to the user (step 308). In certain embodiments, the generated record may then be sent to the publisher (step 310). The steps are performed on a user device 122 using the hardware and/or software of the user device 122. For example, in certain embodiments, the steps of method 300 are performed by an extension for a web browser running on the user device 122 by which the user 104 accesses the websites of the publisher 106 and/or advertiser 120 (or affiliate network 118) in order to perform transaction to earn rewards. Each step is discussed in further detail below.

Determining when a reward is authorized (step 302) entails determining if the publisher 102 has authorized a reward for a particular online transaction with an advertiser 120. To accomplish this, the user device 122 makes use of an electronic network (telecommunication network 116) to communicate with the publisher 102. The publisher 102 had data store, stored for example on storage device 114, which includes details of rewards that are authorized or otherwise available for transactions with advertisers 120. This data store is created by processing, using the publisher processor 106, data previously received, prior to the current online transaction, from one or more computer devices of the advertiser corresponding to an initiative of the publisher 102. In certain embodiments, the one or more computer devices of the advertiser includes an affiliate network 118 acting as an intermediary transferring data between the advertiser 120 and publisher 102.

As previously discussed, advertisers 120 (and affiliate networks 118) register with the publisher 102 to participate in a reward initiative. The data received by the publisher from the advertiser includes the necessary details for registration which can include: eligible product(s), time window of eligibility, amount of commission(s), payment details, affiliate network details, and other information necessary for registration. For the reward of the current transaction to be authorized, the advertiser 120 has to have registered with the publisher 102 prior to the transaction.

The underlying processing for determining if a reward is can be done locally on the user device 122 or remotely at the publisher 102. Examples of each of the approaches can be seen if FIG. 4 and FIG. 5 respectively.

Figure 4:
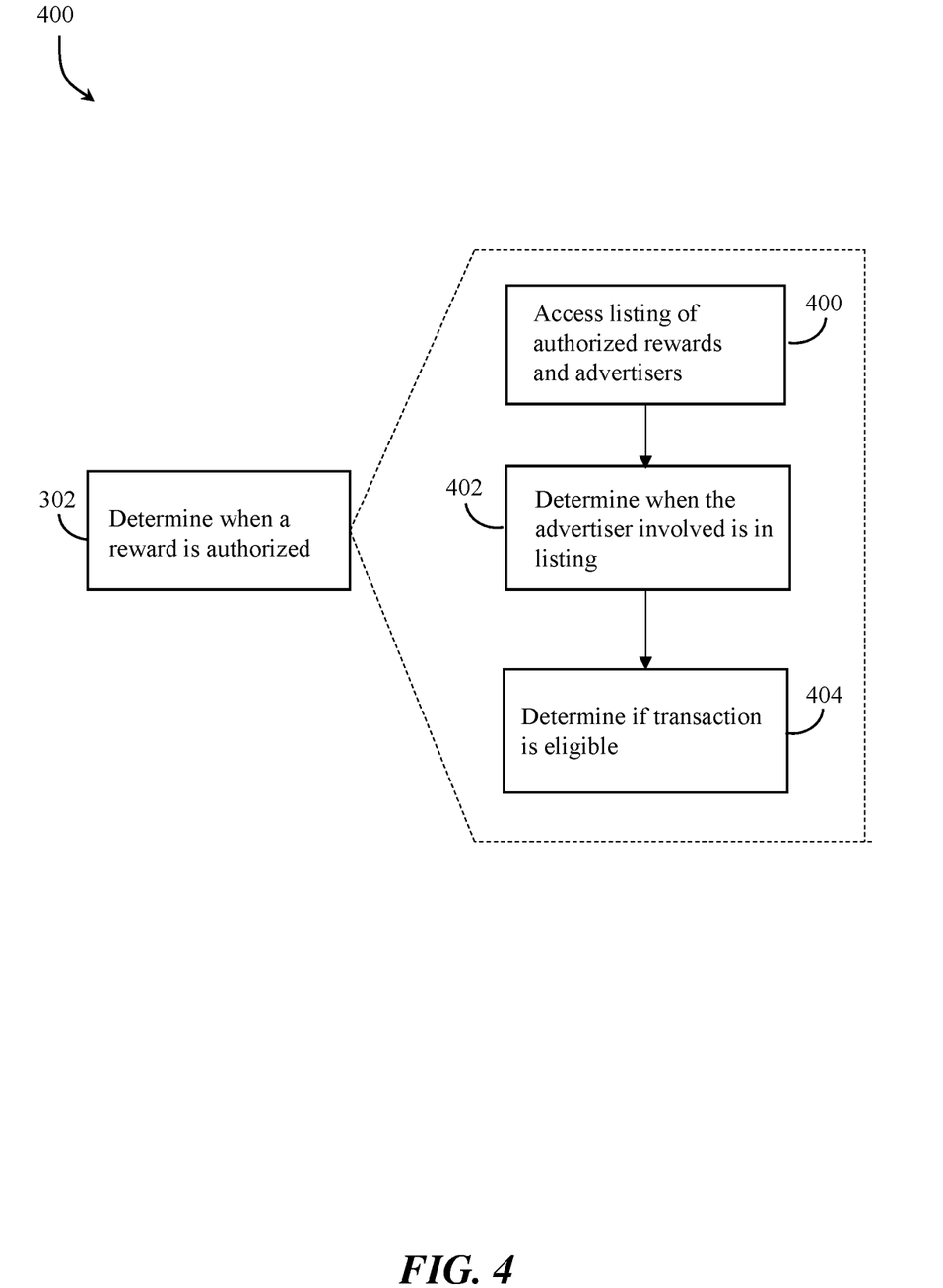
FIG. 4 is a diagrammatic flow chart illustrating an example computer implemented method describing the how a reward is determined to be authorized.

In the example of FIG. 4, the step of determining when a reward is authorized (step 302) further comprises three steps. First a listing of authorized rewards and participating advertisers is accessed from the publisher (step 400). Then it is determined if the advertiser 120 participating in the transaction is in the listing (step 402). Finally, it is determined if the transaction is eligible for a reward (step 404).

The data store of the publisher 102 concerning publisher initiatives can be accessed periodically by the user device 122 such that the necessary listing is downloaded prior to the transaction and is available locally on the user device 122 at the time of the transaction or the user device can dynamically contact the publisher 102 to access the listing at the time of the transaction The listing represents the publisher initiatives including rewards and participating advertisers stored in the data store of the publisher 102.

Having accessed the listing (step 400), the listing can be checked to see if the advertiser participating in the current transaction appears in the listing (step 402) indicating that the advertiser is participating in a publisher initiative in which the user can earn reward. Then activity identifier data can be parsed and extracted from transaction data corresponding to the online transaction and compared to data corresponding to the advertiser and to see if it matches any parameters of a publisher initiative (step 404) indicating that the transaction is eligible for a reward.

Activity identifier data can include tracking parameters, transaction type data, user account data, link data, purchase amounts, receipt data, registered user profile data, advertiser identification data, device data or stored uniquely identifying data.

In the example embodiment of FIG. 4, the processing involved in the further steps is performed by the user device 122 using the hardware and software of the user device 122. However, in other embodiments the processing of the stored data of the publisher 102 can be performed at on the publisher system by the publisher processor 106. How this is initiated and otherwise handled by the user device can be seen in FIG. 5.

Figure 5:
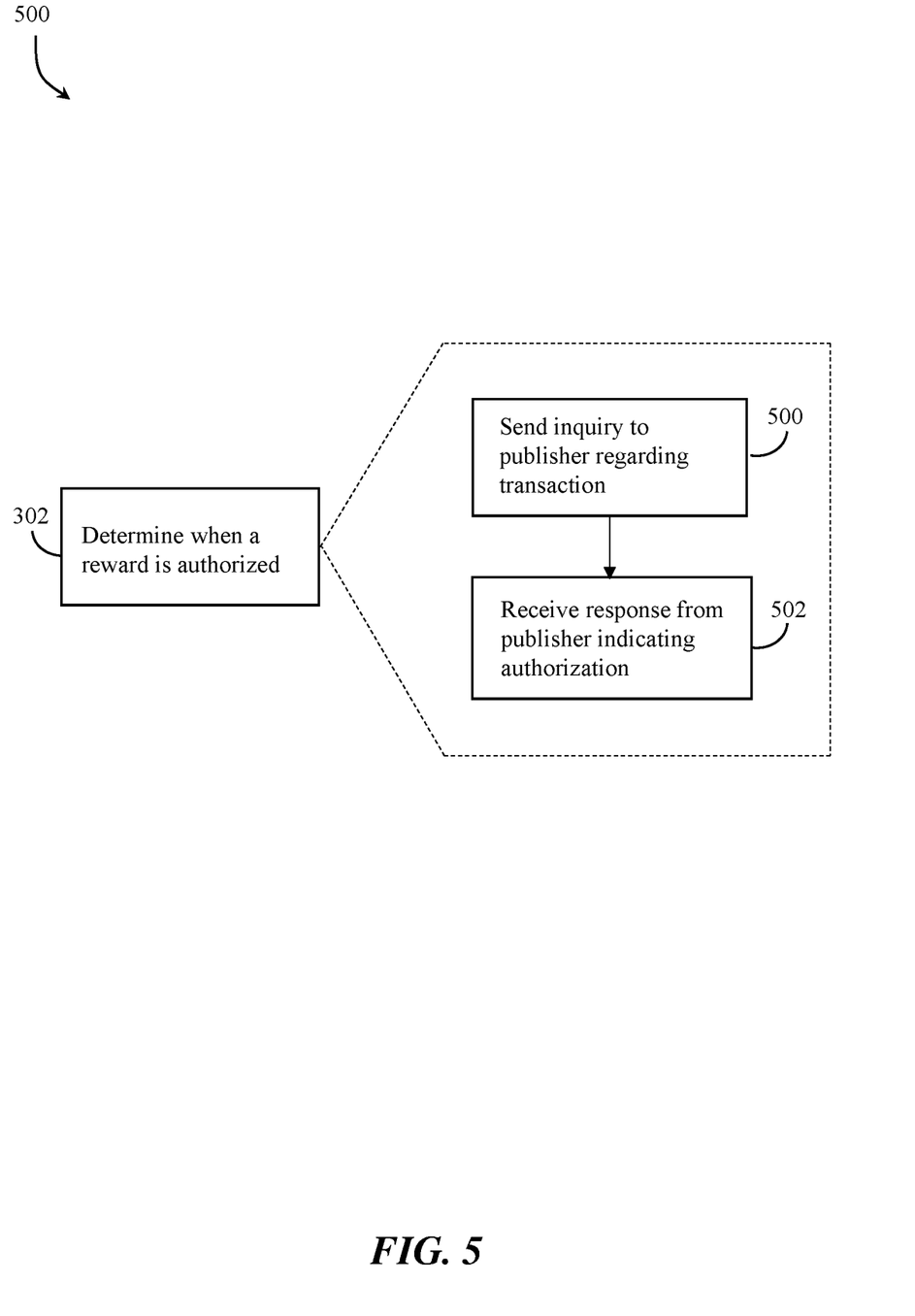
FIG. 5 is a diagrammatic flow chart illustrating another example computer implemented method describing the how a reward is determined to be authorized

In the alternate methodology of FIG. 5, the step of determining when a reward is authorized (step 302) is composed of two steps. First an inquiry is sent to the publisher 102 regarding the online transaction with the advertiser (step 500). A response is then received from the publisher 102 indicating whether the online transaction with the advertiser 120 is authorized for a reward (step 502).

In sending the inquiry (step 500), the user device 122 may transfer data regarding the transaction to the publisher 102 so as to provide details necessary to identify and authorize the transaction. In certain embodiments this involves parsing and extracting activity identifier data from the transaction data. In other embodiments, part or all of the transaction data is transferred to the publisher. In certain such embodiments, a screen capture, or in some cases, the underlying code or data resulting in the displayed screen is provided to the publisher for parsing and extraction. The publisher 102 can then process this data in a manner similar to shown and discussed in regard to FIG. 4. Once, the publisher 102 makes a determination that a reward is authorized, the publisher 102 sends a response back, which is received at the user device 122 (step 502).

Referring back to FIG. 3, after it is determined if a reward is authorized (step 302), it is determined whether the transaction is conducted (step 304). This is done by parsing and extracting activity identifier from transaction data corresponding to the online transaction made with the advertiser 120. Activity identifier data can include tracking parameters, transaction type data, user account data, link data, purchase amounts, receipt data, registered user profile data, advertiser identification data, device data or stored uniquely identifying data. In certain embodiments, determining when the online transaction with the advertiser 120 involving reward is conducted involve determining or detecting when the online transaction has obtained transaction confirmation data from a transaction confirmation page of the advertiser 120 and details of confirmed transaction meet requirements for the authorized reward.

As with the step of determining if a reward is authorized (step 302), the step of determining when a transaction is conducted (step 304), including any necessary parsing and extracting of data, can be performed by on the user device 122. However, in some embodiments, the parsing and extracting f data, as well the actual determination can be performed by the publisher 102 using the publisher processor 106 and other hardware and software of the publisher 102. For example, in cases where the publisher 102 was used to make the determination whether a reward was authorized, the publisher 102 may already have the necessary activity identifier data to make a determination that the transaction was conducted. In certain other embodiments, the user device 122 can provide necessary confirmation details or even screen captures which are then processed at the publisher 102. Once the publisher 102 completes the processing, the result can be provided to the user device 122.

Once it is determined that a transaction with an advertiser 120, which is authorized for a reward, has been conducted and completed (step 306). A record of the reward earned is generated (step 308). This record includes details regarding the transaction such as: time, date, advertiser 120, cost, promotion or initiative involved, rebate earned, a unique identifier for tracking purposes, and the status of the rebate in the payout process. In certain embodiments, the generated record is included in a maintained registry of all the rewards earned by a user 104. The generated record, including the maintained registry can be stored locally on the user device 122. In certain embodiments the registry of generated records or separate registry similar to the registry on the user device 122 is maintained at the publisher 102. The user 104 can then access this record at any time after the transaction to review the details and status of the earned reward. In similar manner where a registry is maintained, the user can also access the registry at any time and review the details of any reward earned by the user 104. This provides the user 104 with a resource for verifying and advocating their position in the reward process as discussed in regard to FIG. 2.

Based on the generated record (step 306) a confirmation of the earned reward can be displayed (step 308). An example of such a confirmation 600 displayed on a user device 122 can be seen in FIG. 6.

Figure 6:
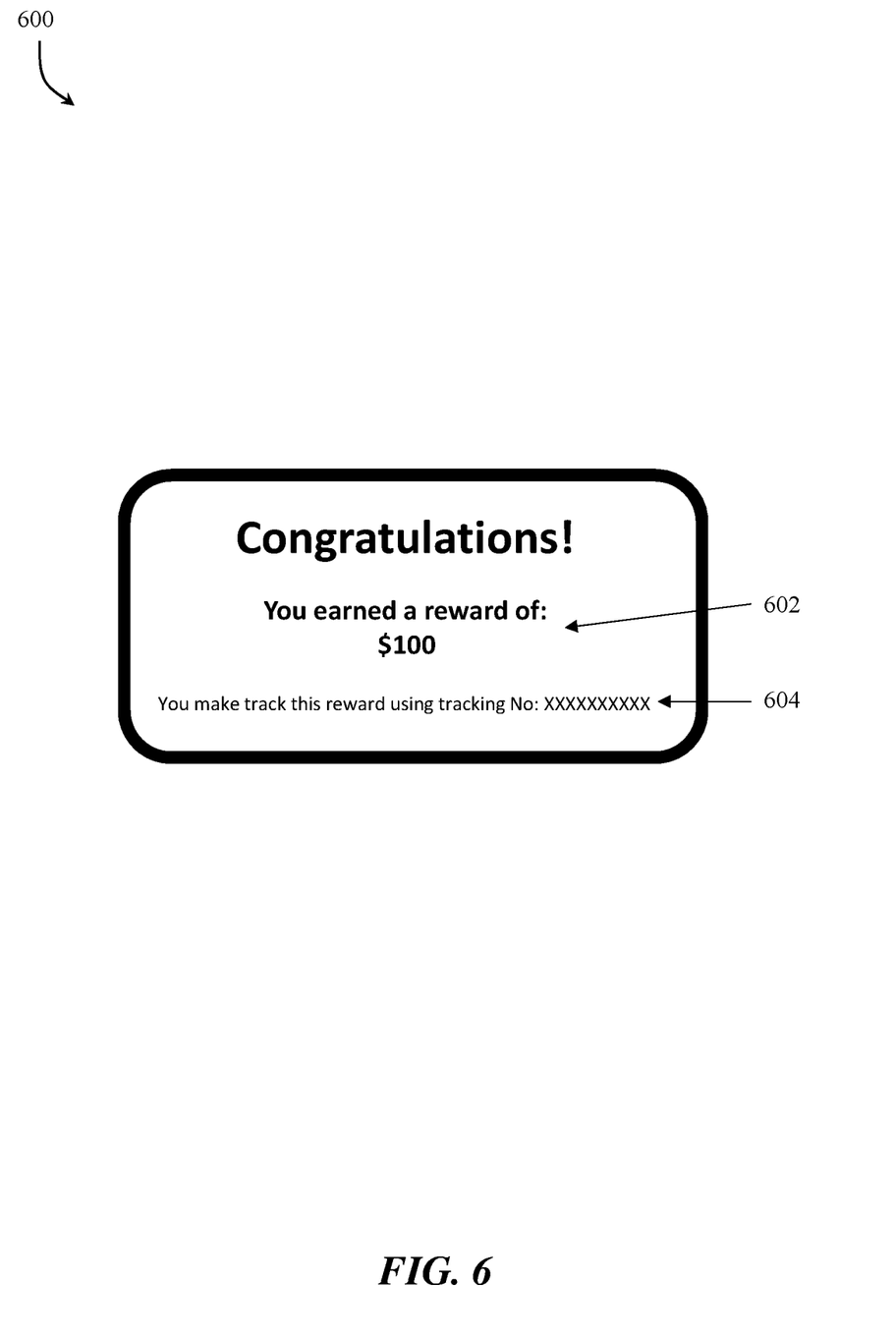
FIG. 6 is a graphical display illustrating an example reward confirmation.

In the example of FIG. 6 the displayed confirmation 600 can include an indication of the reward earned 602 for the completed transaction as well as a unique indicator 604 for identifying and tracking the details of the reward earning transaction. In certain embodiments, the unique indicator 604 may be provided as a link to the generated record or maintained registry entry for the transaction. The data or information provided as part of the confirmation 600 can vary depending on implementation. For example, in some cases the amount earned may not be known at the time of the transaction, in such instances the confirmation 600 may omit the reward earned 602. Similarly, the tracking information or unique identifier 604 may also be omitted in some instances. In some embodiments the confirmation 600 may be displayed as a pop up or separate screen on the graphical user interface of the user device 122. The displayed confirmation 600 provides the user with immediate feedback regarding the reward process and provides an additional resource in advocating for the user 104 in the rebate process as discussed in regard to FIG. 2.

In certain embodiments, the method 300 of FIG. 3 further includes the step of sending the generated record to the publisher 102 (step 310). This is performed by the user device 122 using the network 116. In providing the record to the publisher 102, the user 104 notifies the publisher that a reward has been earned and provides data in support of that position. The received record can be stored and used to update or verify the data store at the publisher 102 regarding the status of the reward in the payment process and facilitate the payment of the reward to the user 104. An example of this process can be seen in FIG. 7.

Figure 7:
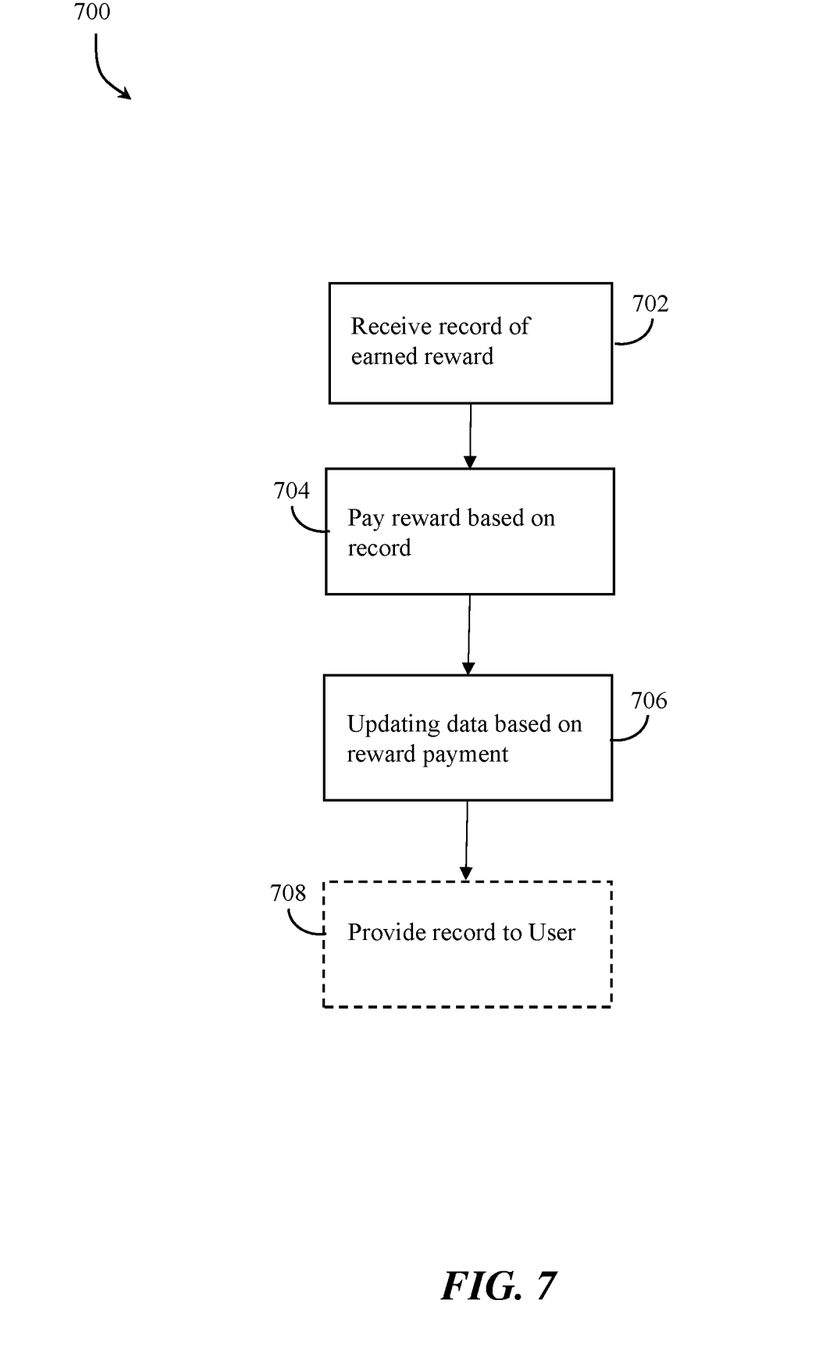
FIG. 7 is a diagrammatic flow chart illustrating an example computer implemented method that describes how payments are made based on record of earned reward provided by user device.

FIG. 7 demonstrates how the rewards are handled by the publisher 102 in view of the record provided by the user 104. The example method 700 includes receiving at the publisher 102 a record of the earned reward (step 702), paying the reward based on the record (step 704), and updating data based on reward payment (step 706). In certain embodiments, the method 700 further includes the step of providing a record to the user 104 (step 708).

As discussed previously in regard to FIG. 3 the user 104 sends a record of earned reward that includes data about the transaction that earned the reward. However, it was also discussed previously in regard to FIG. 2 how the advertiser 120 also provides a report of the transaction the publisher 102 including the status of the commission due to the publisher 102. By comparing the record received from the user 104 with the record received from the advertiser 120 the publisher 102 is better able to determine that a reward is earned and facilitate payment of the reward to the user 104. For example, if the record received from the user 104 and the record received from the advertiser 102 largely agree, then the publisher 102 can proceed with payment of the reward to the user 104 (step 704). If however, there are discrepancies between the record received from user 104 and the record received from the advertiser 120 then the publisher 102 can generate an inquiry with the advertiser.

The processing and determination based on the analysis of received records, be it payment or generating an inquiry, is performed by the publisher processor 106 of the publisher 102. The received records are stored in the data store of the publisher 102 in memory 108 or the storage device 114. In certain embodiment, as discussed previously, there is a maintained registry of the records received for each user 104. Such maintained registries can also include the records received from the advertisers 120. Alternatively, there can be a separate maintained registry just for the records from the advertiser 120.

In implementations where the received records substantially match, the publisher 102 can proceed with paying the reward to the user 104. In some instances this occurs as set forth as described in relation to FIG. 2 where upon receiving indication from the advertiser 120 that the commission is locked, the publisher 102 can pay the reward to the user 104 based on a request from the user 104. As such, the record received from the user 104 confirming the earned reward can serve as the request for payment.

In certain embodiments, if the record received from the user 104 substantially matches the record received from the advertiser 120 then the record received from the user 104 can act as confirmation or verification that the reward earned indicated by the record provided by the advertiser 120 is warranted. Payment is performed using a processor 106 of the publisher 102. The reward payment is made by at least one transfer to a user account according to stored processing data corresponding to a stored user profile as described previously.

Once payment is made (step 704), the corresponding data stored at the publisher 102 is updated accordingly based on the reward payment (step 706). This involved generating and storing updates to the data and records regarding user 104 and advertiser 120 involved in the transaction for which the reward was paid. Such data includes the user account, advertiser account, data store, user profile and advertiser profile. In embodiments with maintained registries, such maintained registries are updated accordingly.

In certain embodiments, a record can then be sent or otherwise provided to the user 104. The provided record can include whether a reward payment was made for a transaction, whether an inquiry was generated regarding an earned reward, the status of reward payments, or the like. In embodiments where there are one or more maintained registries, the information of such a record can include in the maintained registry.

Figure 8:
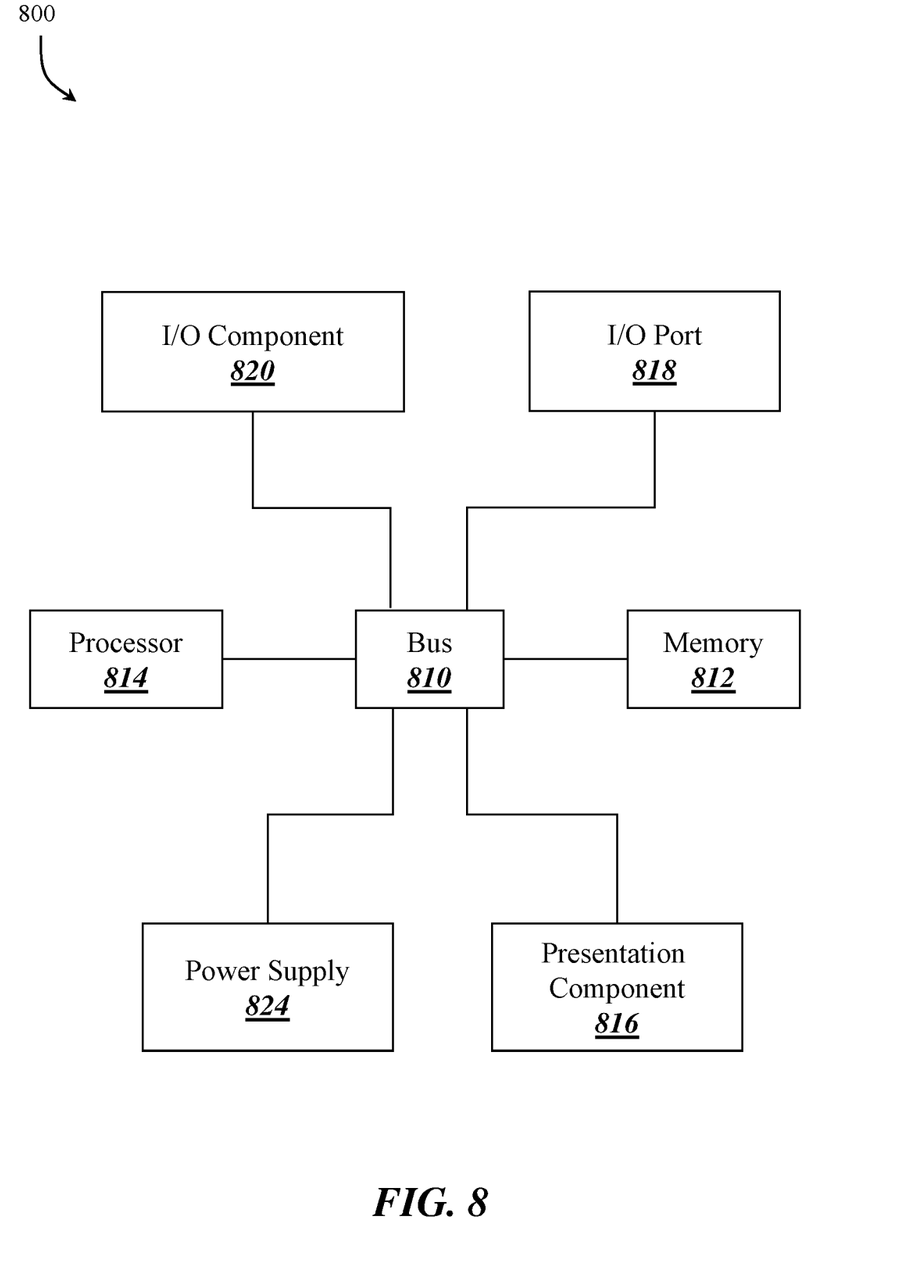
FIG. 8 is a diagrammatic illustration of a high level architecture for implementing systems and processes in accordance with aspects of the invention.

Any suitable computing device 800 can be used to implement the computing/user devices 122, or the server of the publisher 102, and methods/functionality described herein and be converted to a specific system 100 for performing the operations and features described herein through modification of hardware, software, and firmware, in a manner significantly more than mere execution of software on a generic computing device 800, as would be appreciated by those of skill in the art. One illustrative example of such a computing device 800 is depicted in FIG. 8 is a diagrammatic illustration of a high-level architecture for implementing systems and processes in accordance with aspects of the invention. The computing device 800 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices 800, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, 106, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device 122, 800 that can be used to implement one or more embodiments of the present invention, and in no way limits the invention.

The computing device 800 can include or interact with a variety of computer-readable media. For example, computer-readable media can include Random Access Memory 108 (RAM); Read Only Memory 108 (ROM); Electronically Erasable Programmable Read Only Memory 108 (EEPROM); flash memory 108 or other memory 108 technologies; CDROM, digital versatile disks (DVD) or other optical or holographic media; magnetic cassettes, magnetic tape, magnetic disk storage (storage devices 114) or other magnetic storage devices that can be used to encode information and can be accessed by the computing device 800.

The memory 812 can include computer-storage media in the form of volatile and/or nonvolatile memory 108. The memory 812 may be removable, non-removable, or any combination thereof. Exemplary hardware devices are devices such as hard drives, solid-state memory 108, optical-disc drives, and the like. The computing device 800 can include one or more processors 106 that read data from components such as the memory 812, the various I/O components 816, etc. Presentation component(s) 816 present data indications to a user device 122 or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a microphone, joystick, recording device, game pad, satellite dish, scanner, printer, wireless device, networking device, and the like.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of tracking and displaying earned rewards for online transactions at a time coinciding with completion of an online transaction, the method comprising:
    storing, on a data store of a publisher system, data previously received prior to the online transaction from one or more computer devices of the advertiser corresponding to an initiative of the publisher comprising a listing of publisher initiatives including rewards and participating advertisers;
    sending, by a user device using an electronic network at the time of the online transaction, an inquiry to the publisher system regarding the online transaction with the advertiser;
    processing, by a publisher processor of the publisher system at the time of the online transaction, the previously received data stored on the data store comprising:
        determining when the advertiser participating in the online transaction has been stored in the data store of the publishing system in the listing; and
        determining when the online transaction is eligible for reward by parsing and extracting activity identifier data from transaction data corresponding to the online transaction and comparing the activity identifier data to stored data corresponding to the advertiser to determine a match for any parameters of an initiative of the publisher;
    receiving, by the user device, a response from the publisher system that the online transaction with the advertiser is authorized for reward at the time of the online transaction;
    determining, on the user device at the time of the online transaction, when the online transaction with the advertiser involving a reward authorized by a publisher is conducted by parsing and extracting activity identifier data from transaction data corresponding to the online transaction made with the advertiser;
    generating, on the user device, a record of reward earned based on a conducted transaction with advertiser without awaiting payment processing actions between the advertiser and the publisher to occur; and
    displaying, on a graphical user interface of the user device at a time coinciding with the completion of the online transaction, confirmation of earned reward based on conducted transaction with the advertiser.

2. The method of claim 1, wherein the determining, generating, and displaying by the user device is performed by an extension for a web browser.

3. The method of claim 1, wherein displaying comprises a pop up or separate screen presented on the graphical user interface of the user device.

4. The method of claim 1, wherein determining when the online transaction with the advertiser involving reward is conducted comprises:
determining, using tracking parameters, when the online transaction has obtained transaction confirmation data from a transaction confirmation page of the advertiser and details of confirmed transaction meet requirements for authorized reward.

5. The method of claim 1, wherein the activity identifier data comprises one or more of tracking parameters, transaction type data, user account data, link data, purchase amounts, receipt data, registered user profile data, advertiser identification data, device data or stored uniquely identifying data.

6. The method of claim 1, wherein determining a reward is authorized by a publisher further comprises: comparing activity identifier data comprising registered user profile data sent from the user device to a registered user profile stored at the publisher system to determine a match and confirm the registered user profile data.

7. The method of claim 1, further comprising:
sending the generated record of reward earned to the publisher system; and
storing the record of reward earned received in a data store of the publisher system.

8. The method of claim 7, further comprising:
receiving, at the publisher, a record of the online transaction involving reward from the advertiser and the record of reward earned from publisher;
paying, using a processor of the publisher, a reward payment made by at least one transfer to a user account according to stored processing data corresponding to a stored user profile; and
generating and storing updates to the user account, the stored processing data, and the stored user profile corresponding to the reward payment.

9. The method of claim 8, wherein the paying of the reward payment occurs prior to at least one of the group consisting of locking a commission of the advertiser, expiration of a refund period, payment of a commission by the advertiser to the publisher system, payment of a commission by the advertiser to an affiliate network, and combinations thereof.

10. The method of claim 7, further comprising:
receiving, at the publisher, a record of the online transaction involving reward from the advertiser;
comparing record received from user device and record received from advertiser; and generating inquiry if discrepancies between received records are found.

11. The method of claim 7, further comprising:
sending, from the publisher system to the user device, an updated record of rewards earned from the publisher.

12. A system automating tracking and displaying of earned rewards for online transactions at a time coinciding with completion of an online transaction, the system comprising:
a publisher processor, with memory, configured to process data previously received from one or more computer devices of the advertiser corresponding to an initiative of the publisher prior to the online transaction and stored on a data store of a publisher system;
a user device comprising memory and a processor configured to determine when a reward is authorized by a publisher for an online transaction with an advertiser using an electronic network,
an extension for a web browser configured to transmit data and running on the user device by which the user device accesses websites using the electronic network;
wherein the user device sends, at the time of the online transaction, an inquiry to the publisher system regarding the online transaction with the advertiser;
wherein the publisher processor parses and extracts activity identifier data from transaction data corresponding to the online transaction made with the advertiser at the time of the online transaction by:
determining when the advertiser participating in the online transaction has been stored in the data store of the publishing system in a listing of participating advertisers; and
determining when the online transaction is eligible for reward by parsing and extracting activity identifier data from transaction data corresponding to the online transaction and comparing the activity identifier data to stored data corresponding to the advertiser to determine a match for any parameters of an initiative of the publisher;
wherein the user device receives, at the time of the online transaction, a response from the publisher system that the online transaction with the advertiser is authorized for reward; and
a graphical user interface of the user device configured to display, at a time coinciding with the completion of the online transaction, a confirmation of earned reward based on the conducted transaction with the advertiser from a record of reward earned generated on the user device based on a conducted transaction with the advertiser without awaiting payment processing actions between the advertiser and the publisher to occur.

13. The system of claim 12, wherein the activity identifier data comprises one or more of tracking parameters, transaction type data, user account data, link data, purchase amounts, receipt data, registered user profile data, advertiser identification data, device data or stored uniquely identifying data, and
wherein activity identifier data, transaction confirmation data from a transaction confirmation page of the advertiser, and details of confirmed transaction are used to determine when the online transaction meets requirements for authorized reward.

14. The system of claim 12, further comprising:
a record of the online transaction involving reward from the advertiser and the record of reward earned from publisher generated by the user device and sent to the publisher system;
a reward payment made by at least one financial transfer enabled by a financial entity to a user account using a processor of the publisher according to stored processing data corresponding to a stored user profile, then stored as an update to the user account, using the stored processing data, and the stored user profile corresponding to the reward payment; and
wherein the publisher system sends an updated record of rewards earned from the publisher to the user device.

15. The system of claim 14, wherein the reward payment precedes at least one of the group consisting of locking a commission of the advertiser, expiration of a refund period, payment of a commission by the advertiser to the publisher system, payment of a commission by the advertiser to an affiliate network, and combinations thereof.

\* \* \* \* \*